United States Patent [19]

Ebert

[11] 4,283,664
[45] Aug. 11, 1981

[54] CONTROL SIGNAL GENERATOR FOR THE COMMUTATING DEVICE OF A BRUSHLESS ELECTRONICS MOTOR

[75] Inventor: Hermann Ebert, Nuremberg, Fed. Rep. of Germany

[73] Assignee: Siemens Aktiengesellschaft, Berlin & Munich, Fed. Rep. of Germany

[21] Appl. No.: 105,868

[22] Filed: Dec. 21, 1979

[51] Int. Cl.³ .................................... H02K 29/00
[52] U.S. Cl. ........................ 318/138; 310/DIG. 3; 318/254; 322/DIG. 5
[58] Field of Search .............. 322/89, 90, DIG. 5, 322/100, 44; 310/DIG. 3; 318/138, 254

[56] References Cited

U.S. PATENT DOCUMENTS

| | | | |
|---|---|---|---|
| 3,663,877 | 5/1972 | Clark | 318/254 A |
| 3,908,130 | 9/1975 | Lafuze | 318/254 A |
| 3,946,292 | 3/1976 | Tanikoshi | 318/254 A |
| 3,979,651 | 9/1976 | Bringol | 318/254 A |
| 4,114,073 | 9/1978 | Uzaka | 318/254 X |
| 4,130,769 | 12/1978 | Karube | 310/DIG. 3 X |
| 4,135,120 | 1/1979 | Hoshimi et al. | 318/138 |

Primary Examiner—Robert J. Hickey
Attorney, Agent, or Firm—Kenyon & Kenyon

[57] ABSTRACT

The control signal generator contains two Hall effect generators which are shifted relative to each other by 90° electrically and magnetically, alao a gating circuit which derives from the Hall signals control signals for the switching elements of the commutating device. In order to make it possible to drive the motor digitally, the invention provides that the gating circuit comprise a combinatorial circit and, succeeding it, a 1-of-4 logic circuit. The combinatorial circuit furnishes two digital drive signals whose switching instants are shifted correspondingly ±45° electrically relative to the zero crossings of the Hall signals.

10 Claims, 15 Drawing Figures

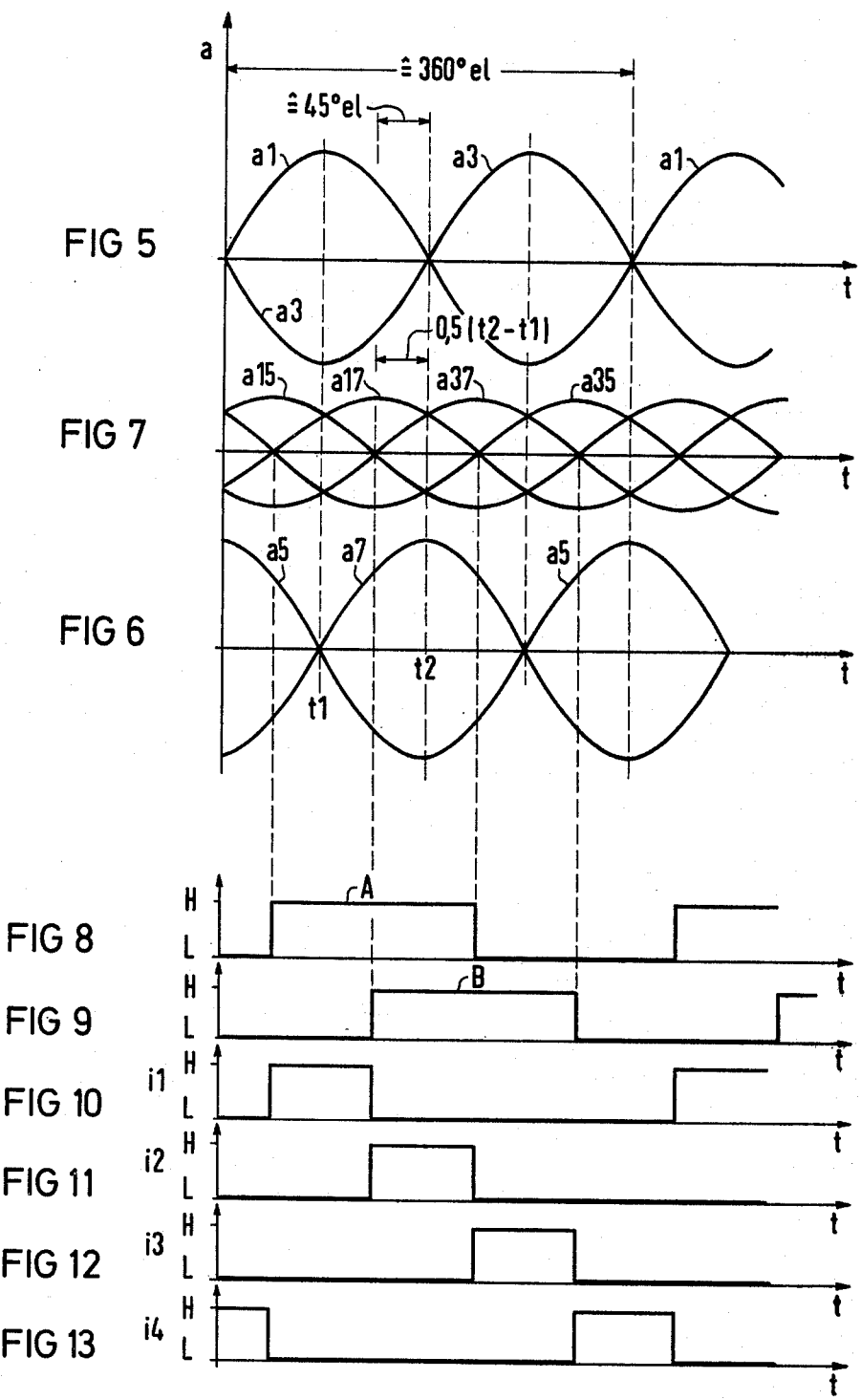

CONTROL SIGNAL GENERATOR FOR THE COMMUTATING DEVICE OF A BRUSHLESS ELECTRONICS MOTOR

BACKGROUND OF THE INVENTION

This invention relates to a control signal generator for the commutating device of a brushless electronics motor in general and move particularly an improved control signal generator permitting a digital drive of the motor.

A control signal generator comprising two Hall effect generators, which are shifted relative to each other by 90° electrically and magnetically and furnish Hall signals depending on the rotor position, and a gating circuit which derives control signals for the switching elements of the commutating device, from the Hall signals of the Hall effect generators is known from "VDE-Fachberichte" No. 25, 1968, pages 147 to 151, in particular FIG. 7. This control signal generator is used in an electronic motor whose stator winding consists of four individual windings, lying in pairs in winding slots of a coil core and disposed at right angles to each other. The stator winding encloses a two-pole rotor magnet. Two magnetic field sensitive components, i.e. two Hall effect generators, which are stationarily disposed, but shifted spatically by 90° relative to each other, are provided as rotor position indicators to signal the position of the rotor magnet. Each Hall effect generator is disposed under a pair of individual windings. This involves a so-called "0° shift". The two Hall effect generators are driven by the magnetic field of the revolving rotor so that the two Hall signals of the one change sinusodially with the angle of rotation and those of the other as a cosine. A gating circuit (FIG. 9 of the same reference) derives control or switching signals for the commutating device from the four Hall signals of the two Hall effect generators. They are derived from the intersections of the Hall signals. The commutating device is equipped with four power transistors as switching elements, connected in series to the individual windings. Each power transistor is preceded by a series transistor. Because all emitter currents of the series transistors flow through one common series resistor, the effect of the control by the two Hall effect generators is such that only the one power transistor whose associated series transistor receives the highest magnitude Hall signal carries current. The series transistors control the power transistors which, in turn, control the currents in the individual windings. This involves an analog drive in which it is quite possible for two single windings in transitory positions to be current carrying simultaneously.

A similar control signal generator for an electronics motor is also known from "Siemens-Zietschrift", April 1971, pages 206 to 208, in particular FIGS. 2 and 5. The stator winding therein also has four individual windings. There, too, two Hall effect generators spatially shifted 90° relative to each other are used. However, they are now not disposed axially to the individual windings, but at half the angle between the individual windings of the stator winding. This involves a so-called "45° shift". The control signals for the commutating device are derived by means of the gating circuit, not from the intersections, but from the zero crossings of the Hall signals generated by the rotor flux. This involves driving the electronics motor digitally. Only H and L signals are used so that each individual winding becomes inactive when the next individual winding is connected.

SUMMARY OF THE INVENTION

The present invention is based on the knowledge that driving an electronic motor, in particular an uncontrolled electronic motor digitally can be cheaper than driving it in analog fashion. The price question plays an important role in mass production, particularly for small appliances such as fans.

Accordingly, it is an object of the present invention to design the control signal generator described at the outset so that a brushless electronic motor which is equipped with two Hall effect generators disposed axially to the single windings, "0° shifted", and is thus basically conceived to be driven in analog fashion, is controlled digitally.

According to the present invention, this problem is solved by using a gating circuit which comprises a combinatorial circuit and a logic circuit following it, the combinatorial circuit furnishing two digital drive signals whose switching instants are shifted by half the time span between two successive zero crossings of the Hall signals, and the logic circuit being designed as a "1-of-4" logic circuit to which the two drive signals are fed, and which delivers at its output one control signal each for the switching elements of the commutating device.

This electronically accomplishes a 45° shift by means of the digital combinatorial circuit. Shifting the Hall effect generators spatially is thus made unnecessary. In other words: Without having to make design changes, the known electronic motor can now also be driven digitally by means of the control signal generator according to the present invention. This results in a price advantage over the use of conventional analog components. Due to the digital control the switching losses in the commutating device are lower.

In one preferred embodiment of the control signal generator of the present invention the two Hall effect generators are series connected with respect to their control current and the combinatorial circuit contains two comparators which have their inputs connected to the Hall voltage terminals of the Hall effect generators via a resistor network. This design requires relatively few and inexpensive components. In principle, deviating therefrom, parallel connection of the control currents of the Hall effect generators may also be provided. However, such a parallel connection would require twice the control current which would lead to an additional load on the control current source.

It is particularly expedient to construct the combinatorial circuit from operational amplifiers because this results in a particularly low cost design. The operational amplifiers may be designed either as amplifiers without external components or be wired as hysteresis switches.

One particularly preferred embodiment results from connecting each Hall voltage terminal of one Hall effect generator via two series connected ohmic resistors to each Hall voltage terminal of the other Hall effect generator, and connecting the inputs of each of the comparators to a center tap of one of the series resistor circuit. In this embodiment, the required signal matching is achievable by appropriately selecting the resistance values. This embodiment is preferred for mass production because no particularly great importance need be attached to precise proportioning of the individual components, since an accurate signal adjustment is achievable through balancing operations.

In another embodiment, distinguished by its simple design with few resistors, one Hall voltage terminal of the one Hall effect generator is connected via two series connected ohmic resistors to one Hall voltage terminal of the other Hall effect generator, and one input of each of the comparators is connected to a center tap of one of the two resistor series circuit while the other input of each is connected to the common control current terminal of the Hall effect generators. However, balancing is a little harder to perform in this embodiment than in the embodiment described before. Also, practical application has shown that special Hall effect generators must be used for this embodiment.

BRIEF DESCRIPTION OF THE DRAWINGS

FIGS. 5 and 6 show the waveforms of the output signals of the Hall effect generators shown in FIGS. 1 and 4.

FIG. 7 shows the waveforms of voltage obtained by combination from the output signals of the Hall effect generators.

FIGS. 8 and 9 show the waveforms of the drive signals furnished by the control signal generators according to FIGS. 1 and 4.

FIGS. 10 to 13 show the waveforms of the winding currents of the electronics motor.

DETAILED DESCRIPTION OF THE INVENTION

Figure 1:
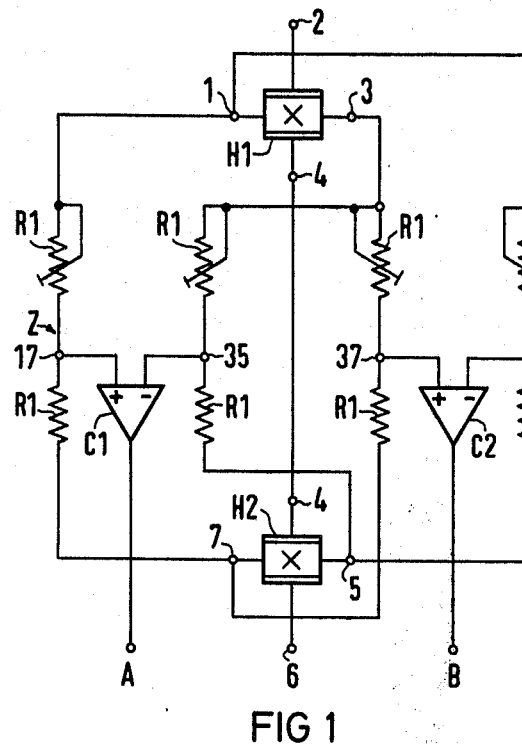
FIG. 1 is a schematic diagram of a first embodiment of control signal generator for an electronically commutated dc motor according to the present invention.

The control signal generator according to FIG. 1 comprises two Hall effect generators H1 and H2 which cooperate with a combinatorial circuit 11.

Figure 14:
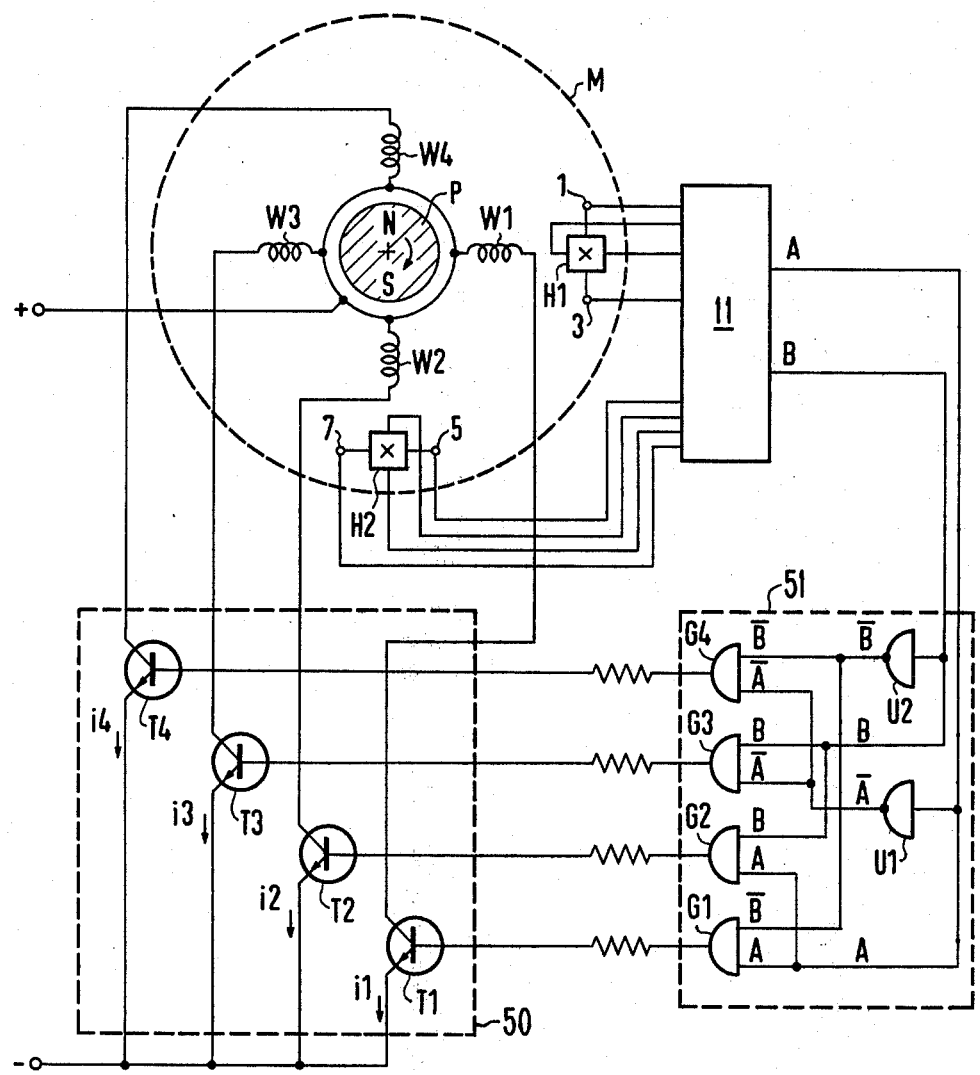
FIG. 14 shows an electronically commutated dc motor with a control signal generator consisting of two Hall effect generators and a gating circuit with combinatorial and logic circuit.

This combinatorial circuit 11 furnishes two digital drive signals A and B to a logic circuit (shown in FIG. 14 as an example). Combinatorial circuit 11 and the logic circuit are components of a gating circuit which, in turn, furnishes control signals for the switching elements of a commutating device of a brushless electronics motor.

According to FIG. 1, the two Hall voltage terminals of the two Hall effect generators H1 and H2 are marked 1, 3 and 5, 7, respectively. The control current terminals carry the reference numerals 2, 4 and 4, 6, respectively. As may be seen, the control current terminals 4 are connected to each other directly (a control current series connection). Moreover, the two Hall voltage terminals 1, 3 of the one Hall effect generator H1 are connected to the two Hall voltage terminals 5, 7 of the other Hall effect generator H2 via a resistor network. This resistor network comprises eight resistors R1, all having the same resistance value, at least approximately. It may be seen in detail that the Hall voltage terminal 1 is connected by two series resistors R1 to the Hall voltage terminal 7 and also to the Hall voltage terminal 5 via two resistors R1 connected in series with each other. Similarly, the Hall voltage terminal 3 is connected via two series resistors R1 to the Hall voltage terminal 5 and also to the Hall voltage terminal 7 via two series resistors R1. The center taps of these four resistor series connections are marked in accordance with the Hall voltage terminals connected to each other, i.e. 15, 17, 35 and 37. Four resistors R1 are shown to be variable. The tolerances of the other resistors R1 can be compensated through these variable resistors R1.

The combinatorial circuit 11 furthermore contains two comparators C1 and C2. These comprise operational amplifiers which are either without external components or wired as hysteresis switches. The non-inverting input of comparator C1 is connected to the center tap 17 and the inverting input to the center tap 35. The output of comparator C1 furnishes the digital drive signal A. The non-inverting input of comparator C2 is connected to the center tap 37 and its inverting input to the center tap 15. The output of comparator C2 furnishes the drive signal B.

The Hall effect generators H1 and H2 of the control signal generator according to FIG. 1 may be connected either in parallel or in series with respect to their control current. Appropriate embodiments are shown in FIGS. 2 and 3, respectively.

Figure 2:
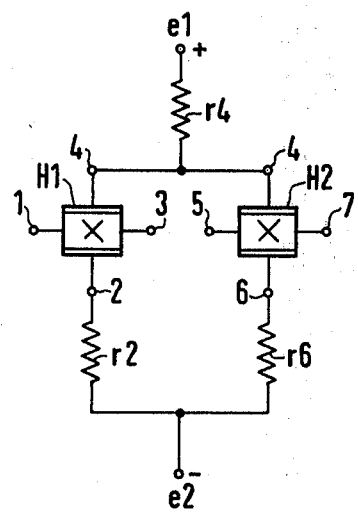
FIG. 2 shows an embodiment with parallel connection of the control current the Hall effect generators.

According to FIG. 2 connected to the control current contacts 2 and 6 of the two Hall effect generators H1 and H2 is one end each of a series resistor r2 and r6, respectively. The other ends of these series resistors r2 and r6 are wired jointly to a negative input terminal e2. One end of the joint control current terminal 4 is connected to one end of a joint series resistor r4. The other end of this series resistor r4 is wired to a positive input terminal e1. A voltage of 10 V, for instance, may be applied across the input terminals e1 and e2, and the resistance of the series resistors r2, r4, and r6 may be, say, about 100 ohms each. The exact figures depend on the type of Hall generators H1 and H2 used.

Figure 3:
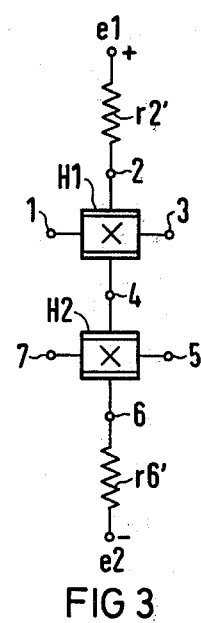
FIG. 3 shown an embodiment with a series connection of the control current of the Hall effect generators.

According to FIG. 3, the control current terminal 2 is connected to a positive input terminal e1 via a series resistor r2′. Similarly, the control current terminal 6 is connected to a negative input terminal via e2 another series resistor r6′. A voltage of 16 V, for instance, may be present between the two input terminals e1, e2. The two series resistors r2′ and r6′ are preferably identical; their resistance may be 620 ohms each, for example. Under circumstances, one of the two series resistors r2′ and r6′ may also be omitted.

Figure 4:
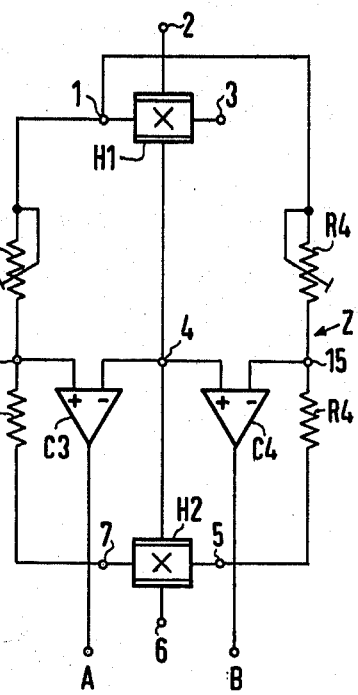
FIG. 4 shows a second embodiment of a control signal generator for an electronically commutated dc motor according to the present invention.

Another embodiment of a control signal generator is shown in FIG. 4. It functions with a resistor network of only four resistors R4, all having the same resistance value, at least approximately. This embodiment includes two resistor series connection of two ohmic resistors R4 each. One resistor R4 in each series connection is shown to be variable. The one series connection is inserted between the Hall voltage terminals 1 and 7, the other between the Hall voltage terminals 1 and 5. Hall effect generators H1 and H2 whose control current resistance changes only as small amount when charged magnetically should be used here. The resultant potential changes at the control current terminal 4 will then also be minor.

Two comparators C3 and C4 are also provided. The non-inverting input of the first comparator C3 is connected to the center tap 17 of the one resistor series connection and its inverting input to the joint control current terminal 4. The non-inverting input of comparator C4 is likewise wired to the joint control current terminal 4; its inverting input is connected to the center tap 15 of the other resistor series connection. The outputs of the two comparators C3 and C4 furnish the drive signals A and B, respectively.

The comparator C1, C2 and C3, C4 according to FIGS. 1 and 4, respectively, are designed so as to effect a change from and L to a H signal, or vice versa, as soon as the voltage between non-inverting and inverting input changes its polarity.

In FIG. 5 the Hall signals a1 and a3 at the Hall voltage terminals 1 and 3, respectively, of the first Hall effect generators H1 are shown, each related to the potential of the control current terminal 4. The Hall signals a1 and a3 are in phase opposition and are sinusoidal in shape.

Shown analogously in FIG. 6 are the Hall signals a5 and a7 of the Hall voltage terminals 5 and 7, respectively, of the second Hall effect generator H2. These Hall signals a5 and a7 are also in phase opposition; they are cosine shaped. Two successive zero crossings are marked t1 and t2 (FIG. 5).

FIG. 7 shows the waveforms of the voltages a15, a17, a35, and a37, referred to the potential of the control current terminal 4, at the center taps 15, 17, 35, and 37, respectively, of the resistor series connections according to FIGS. 1 and 4. It will be noticed that the zero crossings of these voltages a15, a17, a35, and a37, which also have a sinusodial waveform, are shifted by $\pm 0.5(t2-t1)$, corresponding to $\pm 45°$ el, relative to the Hall signals a1, a3, a5, and a7. The ascending and descending flanks of the drive signals A and B are caused, and this is of particular importance, by these zero crossings.

This becomes clear from FIGS. 8 and 9 in which the shape of the drive signals A and B, respectively, is shown as a function of time t. These are each 180° el square waves. The drive signal A is high (H) as long as the voltage a17 is more positive than the voltage a35, and low (L) as long as the voltage a17 is more negative than the voltage a35. This applies correspondingly to the voltages a15 and a37 for the drive signal B. Relative to the drive signal A, it is shifted to the right by 90° el.

A logic circuit (shown in FIG. 14 as an example) generates control signals for the switching elements of the commutating device from the drive signals A and B. Specifically this is done is such a manner that the winding currents i1 to i4 shown in FIGS. 10 to 13 result. It may be seen that each single winding successively carries current for 90° el only. The turn-on and turn-off instants are determined by the ascending and descending flanks of the drive signals A and B. According to FIG. 10, for example, the winding current i1 for the first single winding is shown as a current pulse, beginning with the ascending flank of the drive signal A and ending with the ascending flank of the drive signal B.

Shown in FIG. 14 is also electronic motor M as may be used, for instance, to drive a fan or another small appliance. It is not speed-controlled. The speed could be controlled, for example, by varying the supply voltage. The electronics motor M has a permanent magnet rotor P which rotates in the direction of the arrow shown, with a north pole N and south pole S. The motor also has a stator winding consisting of four individual windings W1, W2, W3, and W4. The individual windings are arranged in pairs at right angles to each other. One of their winding ends is Y connected while their other winding ends are connected to a commutating device 50. The commutating device 50 is an electronic commutator which contains electronic switching elements T1 to T4, in particular power transistors, each of which is connected in series with one individual winding W1 to W4. To supply current to the motor, the switching elements T1 to T4 are connected jointly to the negative pole, and the neutral point of the individual windings W1 to W4 is connected to the positive pole of a voltage source.

A control signal generator comprising to two Hall effect generators H1 and H2, a combinatorial circuit 11, in particular a circuit according to FIGS. 1 or 4, and a following logic circuit 51 are used to drive the commutating device 50. The two Hall effect generators H1 and H2 are stationary and shifted relative to each other by 90° magnetically and electrically. They are disposed axially relative to the individual windings W1 and W2, respectively, and scan the magnetic field which is generated by the rotor P and corresponds to the rotor position.

The logic circuit 51, to which the two drive signals A and B are fed, is designed as a "1-of-4" logic circuit. In the example shown it contains discrete components, namely two NAND gate inverters U1 and U2 having one input each and four AND gates G1 to G4, each having two inputs. Instead of constructing the logic circuit 51 of discrete components, a commercially available IC circuit may also be used, such as the IC circuit MC 145558 made by Morotola Semiconductors, Pheonix, Arizona/USA (see brochure "Semiconductor Data Library", Vol. 5, Series B, 1976, pages 5-420, of Motorola Semiconductor Co.).

According to FIG. 14, the inverse drive signal $\overline{A}$ is formed from A by means of the inverter U1, and the inverted drive signal $\overline{B}$ from B by means of the inverter U2. In the combinatorial circuit shown, pairs of the drive signals A, $\overline{A}$ and B, $\overline{B}$ are fed to the AND gates G1 to G4. The combinatorial circuit shown implements the "1-of-4" logic circuit 51. Instead, OR gates could also be used in place of the AND gates G1 to G4; the inverted drive signals $\overline{A}$ and $\overline{B}$ would then have to be taken off the output of the combinatorial circuit 11, however.

In the present example, the output of each AND gate G1 to G4 is connected via a coupling resistor without reference symbol to the base of the output transistors T1 to T4. For large winding currents i1 to i4, driver transistors or other amplifiers may be inserted between the base terminals of the output transistors T1 to T4 and the four logic outputs of the logic circuit 11. Darlington transistors may also be used in place of the output transistors T1 to T4.

Figure 15:
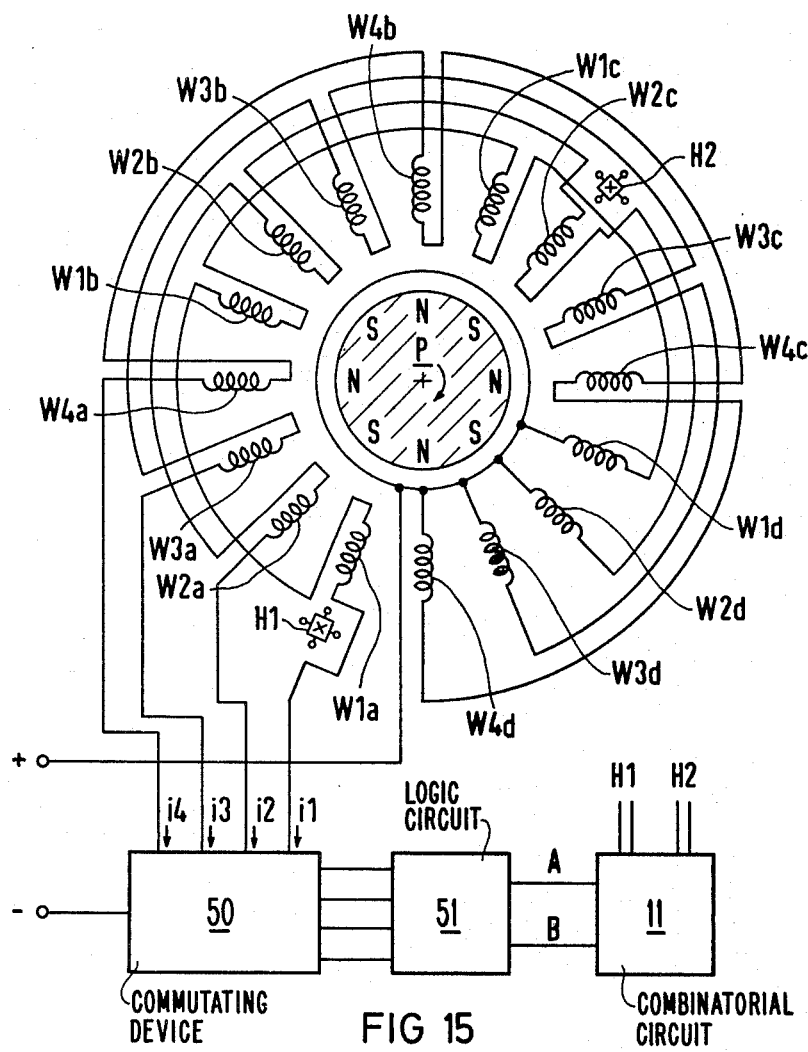
FIG. 15 shows an electronically commutated dc motor with a multiple pole rotor.

It is evident from FIG. 15 that the control signal generator can also be used in connection with a rotor having a number of pole pairs p greater than 1. Identical components have the same reference symbols as in FIG. 14. The permanent magnet rotor P here has p=4 pole pairs N, S. Each individual winding W1 to W4 consists of a series connection of four part winding sections, respectively identified by the addition a, b, c, and d, and disposed so as to be mutually shifted by 360°/p=90° in space. The Hall effect generator H1 is disposed axially to the winding section W1a. The Hall effect generator H2, on the other hand, is not disposed directly next to it, axially to the winding section W2a, but—strictly for reasons of better space distribution—next to the winding sections W2a, W2b, or W2d. The signal terminals of the Hall effect generators H1 and H2 and wired to the combinatorial circuit 11. It is again followed by a logic circuit 51 which, in turn, controls the commutating device 50 digitally.

As may be seen, the series connection of the windings sections W1a, W1b, W1c, W1d, for instance, is energized by the winding current i1. The function of the control signal generator shown corresponds to that of the control signal generator of FIG. 14.

What is claimed is:

1. A control signal generator for the commutating device of a brushless electronic motor comprising:
   (a) two Hall effect generators which are shifted relative to each other by 90° electrically and magnetically and furnish Hall signals as a function of the rotor position;
   (b) a combinatorial circuit receiving said Hall signals and furnishing two digital drive signals whose switching instants are shifted by half the time span between two successive zero crossings of the Hall signals; and
   (c) a 1 to 4 logic circuit having as inputs the two drive signals and having an output which furnishes one control signal for each of the switching elements of the commutating device.

2. A control signal generator according to claim 1, wherein said two Hall effect generators are coupled in series with respect to their control current, and said combinatorial circuit comprises two comparators and a resistor network coupling the Hall voltage terminals of the Hall effect generators to the inputs of said comparators.

3. A control signal generator according to claim 2, wherein said comparators comprise operational amplifiers designed as amplifiers without external components.

4. A control signal generator according to claim 2 wherein said comparators comprise amplifiers wired as hysteresis switches.

5. A control signal generator according to claim 2, wherein each Hall voltage terminal of the one Hall effect generator is coupled to each Hall voltage terminal of the other Hall effect generator through two ohmic resistors in series and wherein the inputs of said comparators are each coupled to a center tap of one of the resistor series connections.

6. A control signal generator according to claim 2 wherein one Hall voltage terminal of the one Hall effect generator is coupled to each of the two Hall voltage terminals of the other Hall effect generator through separate circuits of ohmic resistors in series and wherein one input of each comparator is coupled to a center tap of one of the two resistor series connections while their other input is coupled to the joint control current terminal of the Hall effect generators.

7. A control signal generator according to one of claims 2, 5 or 6 wherein all individual resistors of the resistor network have at least approximately the same resistance.

8. A control signal generator according to claim 7 wherein at least some resistors of the resistor network are variable.

9. A control signal generator according to claim 7 wherein said logic circuit comprises two inverters and four AND gates.

10. A control signal generator according to claim 1 wherein said logic circuit comprise a commercially available integrated circuit.

* * * * *